United States Patent Office 2,906,587
Patented Sept. 29, 1959

2,906,587
TRIAMINO-BENZENE-N-SULFONATE DYES AND PROCESS OF USING SAME

Robert Lazare Lantz and Pierre Marie Joseph Obellianne, Paris, France, assignors to Compagnie Française des Matieres Colorantes S.A., Paris, France, a French company No Drawing. Application January 18, 1954
Serial No. 404,792

11 Claims. (Cl. 8—32)

The present invention concerns improvements in and relating to aromatic amines sulphonated on their amino groups. It particularly relates to the preparation of novel aromatic hydrocarbons substituted by an amino group, by an aminosulphonic group, by another group which may be either an amino group or an aminosulphonic group and, if desired, by other substituents, and to the utilisation of these products for obtaining oxidation colouring matters. The novel products of the present invention have the following general formula:

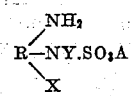

in which,

X represents an $NH_2$ or $NY.SO_3A$ group,

R represents the residue of an aromatic hydrocarbon which may carry other substituents than the $NH_2$ or $NY.SO_3A$ groups, Y represents a hydrogen atom or an organic radical not carrying any solubilising group and A represents a hydrogen atom or equivalent cation.

The preferred compounds are those of the general formula:

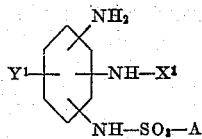

in which X' represents a hydrogen atom or an $-SO_3A$ group,

A represents a hydrogen atom or equivalent cation, and

Y represents a hydrogen or halogen atom or an alkyl or alkoxy group.

The preparation of sulphamates derived from monoamines or diamines has already been described, but those derived from triamines are not known.

In accordance with the present invention the latter may be obtained by treating, with a sulphonating agent, an aromatic derivative substituted by an amino group, by a group convertible into an amino group and by another group which may be either an amino group or a group convertible into an amino group, and then converting into amino groups the groups which are convertible into the latter. The raw materials of this reaction have the following general formula:

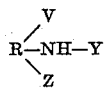

in which R and Y have the same significance as above, V represents a group convertible into an amino group and Z represents either an amino group or a group convertible into an amino group.

When two amino groups exist in the raw material then either one or two may be sulphonated depending on the operating conditions and in particular depending on the amount of sulphonating reagent employed. Thus, 2-nitro-1:4-diaminobenzene may form either 2-nitro-1:4-diaminobenzene-$N^4$-sulphonic acid, or 2-nitro-1:4-diaminobenzene-$N^1$:$N^4$-disulphonic acid which, by reduction give respectively the $N^4$-sulphonic acid or $N^1$:$N^4$-disulphonic acid of 1:2:4-triaminobenzene.

Sulphonation on the amino groups may be effected by means of a sulphonating agent such as, for example, sulphuric chlorohydrin, sulphuric anhydride, oleum, sulphuric acid, sulphamic acid, combinations of sulphuric anhydride with a tertiary amine, an amide or an ether. As examples of tertiary amines capable of being used in the preceding combinations, there may be mentioned pyridine, trimethylamine, triethylamine, ethylmorpholine, and dimethylcyclohexylamine; as examples of amides there may be mentioned dimethyl-formamide; and as examples of ethers there may be mentioned dioxane.

The reaction may be effected either in the presence or absence of a solvent. The solvents which can be used may be, for example, organic solvents such as nitrated and chlorinated derivatives of hydrocarbons, amides, ethers, tertiary amines and even water in the case where the sulphonation is effected by the combination of sulphuric anhydride with certain tertiary amines. Mixtures of solvents may also be used.

The groups which may be converted into amino groups are, in particular, the nitro and acylamino groups. The first yield amino groups by reduction and the second, by hydrolysis.

The reduction of the nitro groups may be effected in an alkaline, neutral or very slightly acid medium. Any known reduction process permitting operation under these conditions may be employed. Among the reducing agents which may be used for this operation, there may be mentioned, for example, alkaline sulphides, alkaline polysulphides, hydrosulphites, salts of sulphurous acid, zinc and iron.

Deacylation of the acylamino group may also be effected in an alkaline, neutral or very slightly acid medium; it is preferably carried out by caustic alkalis.

The free acids of the aromatic triamines sulphonated on a single amino group are, in general, not so soluble in water as their sodium salts. The latter are white products or more or less brown in colour and most of them are very soluble in water. The free acids of the same amines but sulphonated on two amino groups are also less soluble in water than their sodium salts which are very soluble.

The various salts of the new sulphonated derivatives of the invention may be used for the preparation of oxidation colouring matters and they are particularly advantageous when this preparation is effected on the fibre or on any other object.

As oxidising agents which may be used in the process of the invention, there may be mentioned in particular chlorates, chromates, bichromates, nitrites, and peroxides such as hydrogen peroxide or sodium peroxide.

In certain cases, it is advisable to use an oxidation catalyst chosen, preferably, from among those known to be utilisable in the preparation of oxidation colouring matters on fibres, in particular, there must be mentioned derivatives of cerium, osmium, vanadium (vanadate, vanadium chloride), copper and ferrocyanides.

One of the methods of carrying out the process consists in applying the sulphamate, the oxidising agent and, if desired, the catalyst to the fibre in one or more operations by dyeing, fulling, printing etc., and in bringing about development by the action of an acid, which may be dissolved in a bath in which the fibre is steeped, or mixed with water vapour or with air with which the fibre is placed in contact, or formed on the fibre by the conversion of a substance which has previously been applied thereto. This latter conversion may be started, in particular, by contact of the fibre with air which is more or less warm and more or less damp, or with water vapour which may be neutral or which may contain a volatile acid such as acetic acid or formic acid. The substances which are capable of forming an acid under these conditions, are more particularly, salts of volatile bases such as ammonia, amides and organic esters, mineral sulphonates such as fluorosulphonate, aminosulphonate, nitrilosulphonate, iminosulphonate, and hydroxylamine di- and tri-sulphonates. Several of these acidifying substances may be used simultaneously. It may often be advantageous to render alkaline the mixture which is used in this method of carrying out the process. For this purpose a substance is used which, depending on the nature of the fibre and method of development used, may be an alkaline hydroxide, a carbonate, ammonia, an amine, etc. The volatile alkaline substances have the advantage of being able to be eliminated in the course of drying or development when the latter is effected in air or in steam.

The other methods of carrying out oxidation of the sulphamates on the fibre mentioned in the French Patent No. 820,395 of July 15, 1936, may also be applied to the present invention. In particular, this operation may be effected by introducing the fibre into a bath containing sulphamate, an oxidising agent, acid or substance generating acid and, if desired a catalyst. The sulphamate may also be introduced onto the fibre and then treated by the oxidising agent.

In all these methods of carrying out the process, oxidation may be followed by an acid treatment intended to complete or to produce or terminate the elimination of the sulphonic groups, remaining behind on the colouring matter which has been formed. In certain cases it may be advisable, after having applied a sulphamic acid to the fibre, not to oxidise it until after partial or complete elimination of the sulphonic groups bound to the nitrogen atoms of its amino groups. Their elimination may be produced by the action of an acid acting before oxidation or in the course thereof.

The process of the invention includes the use of the sulphamate mixtures defined above, either by themselves, or with other sulphamates and, in particular, with those described in French Patent No. 820,395 of July 15, 1936, and in French patent application filed November 28, 1951, for "Process for the Preparation of Oxidation Colouring Matters and New Sulphamates Which May Be Used for This Preparation," or with the different substances known to provide oxidation colouring matters and more particularly oxidation colouring matters on furs, mixed with amino derivatives; among these substances there may be mentioned di-hydroxyl or aminohydroxyl aromatic derivatives such as resorcinol, dihydroxynaphthalenes, aminophenols, etc. The use, according to the invention, of such mixtures is not, of course, limited to the dyeing of furs.

The printing colours and baths used for fulling or dyeing may contain known auxiliary materials such as solvents, substances facilitating wetting or penetration, hygroscopic substances, substances intended to prevent the formation of an excessive degree of acidity such as substance having a buffer action, for example, salts of weak acids, substances intended to prevent per oxidation or the premature oxidation of the pastes before or after printing, for example, reducing substances.

The shades obtained by oxidation of the derivatives of triamines which are mono- and di-sulphonated in the amino groups are generally brown. They are very fast. Certain of them have the advantage of developing very rapidly, although the dyeing, impregnating, or printing solutions used in order to obtain them have good storage properties.

The present process may be applied to the dyeing or printing of objects of different nature, and more particularly, of natural or artificial fibres. These objects or fibres may be formed, for example, of wool, silk, furs, horse-hair, bristles, human hair and similar material, natural or regenerated cellulose, cellulose ethers and esters, high synthetic polymers, for example, superpolyamides, superpolyesters, vinyl-chloride polymers and other substituted derivatives of vinylidene.

The process according to the invention permits of the joint use of other important colouring matters such as sulphuric esters of leuco derivatives of vat dyestuffs (Solasol, Indigosol) or the mixtures known under the names of Naphthazogene, Rapidogene etc., which contain coupling components free from solubilising groups and diazoamino compounds, the cleavage of which yields diazo derivatives which are likewise free from these groups or possess some which may be eliminated in the course of the development of the colouring matters. These colouring matters may be used by placing them side by side with those of the invention or even mixed therewith. It is possible to effect these operations, either by printing, by impregnation or fulling. They are preferably developed in one operation by a means suitable at one and the same time for the two categories of colouring matter, but each colouring matter may also be developed by a special operation.

The invention will be more clearly understood by reference to the following examples, in which the parts given are by weight, which are purely illustrative.

Example 1.—45 parts of sulphuric chlorhydrin are slowly introduced into 150 parts of anhydrous pyridine so that the temperature does not exceed 35° C.; then, at ordinary room temperature, 60 parts of 2-nitro-1-amino-4-acetylamino-benzene are added. The mixture obtained, well agitated is heated slowly to 50° C.; agitation is continued for 2 hours, then the mixture is poured into a solution containing 70 parts of sodium carbonate and 200 parts of water; the reaction must remain alkaline to Brilliant Yellow paper. After removing pyridine as vapour, the derivative sulphonated on the amino group crystallises on cooling. It is dried and washed to neutrality with a saturated solution of sodium chloride.

The sulphonated derivative is then introduced progressively into 300 parts of well agitated water maintained at boiling point into which 80 parts of fine iron turnings and two parts of glacial acetic acid had previously been introduced. When the reduction is complete, three parts of sodium carbonate are added, the mixture is filtered whilst hot and the alkaline filtrate is concentrated until crystallisation begins. It is allowed to cool and the product obtained is dried.

The latter is then treated at boiling point for 30 minutes with 10 times its weight of a 5% caustic soda solution. After cooling to about 10° C. the greater part of excess alkali is neutralised by concentrated hydrochloric acid, so as to preserve a slight alkaline reaction; it is concentrated in the absence of air until an abundant precipitation is obtained on cooling. The sodium 1:2:4-triaminobenzene-$N^1$-sulphonate is precipitated. After dessiccation under vacuum, it forms a chestnut powder. This may be recrystallised from a 50% water-alcohol mixture and it then forms a beige powder.

2-nitro-1-amino-4-acetylamino-benzene may be prepared by following the instructions of Buelow and Mann (Berichte 30, p. 981).

Example 2.—152 parts of sulphuric chlorhydrin are slowly introduced into 400 parts of anhydrous pyridine in such a manner that the temperature does not exceed 35° C.; then, at ordinary room temperature, 152 parts of 2:4-dinitro-1-aminobenzene are added. The mixture obtained, well agitated, is heated at 50° C. for 2 hours, then it is poured into an aqueous solution containing 210 parts of sodium carbonate and 1,200 parts of water. After removing the pyridine, the mixture is filtered hot to separate the unreacted 2:4-dinitro-1-aminobenzene. On cooling, the sodium 2:4-dinitro-1-aminobenzene-N-sulphonate crystallises. It is dried and washed to neutrality with a saturated solution of sodium chloride.

It is reduced under the conditions of Example 1 in 1,000 parts of water with 360 parts of iron turnings activated by 3 parts of glacial acetic acid. The sodium 1:2:4-triamino-benzene-$N^1$-sulphonate crystallises on concentration of the alkaline reduction solution. It possesses the properties of that obtained in Example 1.

*Example 3.*—A sulphonation is carried out as in Example 1, but replacing 2-nitro-1-amino-4-acetylamino-benzene by the same quantity of 1-amino-2:5-di-(acetylamino)-benzene. After removing the pyridine by water vapour, the sulphonated derivative obtained is precipitated with brine and is treated for 30 minutes at boiling point with 15 times its weight of a solution containing 50 grams of sodium hydroxide per litre. The sodium 1:2:4-triaminobenzene-$N^2$-sulphonate is precipitated by concentration of the solution in the absence of air after having neutralised the greater part of the alkali which it contains. After recrystallisation from a water-alcohol mixture it is in the form of a brown powder.

The initial 1-amino-2:5-di-(acetylamino)-benzene may be obtained by reducing by means of iron the 1-nitro-2:5-di-(acetylamino)-benzene obtained in accordance with Buelow and Mann (Berichte 30, p. 981).

*Example 4.*—By following the instructions of Example 1, but by using 100 parts of anhydrous pyridine, 16.5 parts of sulphuric chlorhydrin and by replacing the 2-nitro-1-amino-4-acetylamino-benzene by 20 parts of 1-nitro-2:5-diamino benzene, sodium 1-nitro-2:5-diamino-benzene-$N^5$-sulphonate is obtained which, precipitated by salt and reduced by iron as in the same example, produces sodium 1:2:4-triamino-benzene-$N^4$-sulphonate which is precipitated by salt. In a dry condition, this product forms a powder which may be purified by separating the precipitate obtained by cooling its solution in a mixture of water and alcohol.

*Example 5.*—225 parts of sulphuric chlorohydrin are slowly introduced into 500 parts of anhydrous pyridine in such a manner that the temperature does not exceed 35° C. 100 parts of 1-nitro-2:5-diamino-benzene are then added, at ordinary room temperature. The mixture is agitated for 3 hours at ordinary room temperature, then it is poured into a solution containing 280 parts of sodium carbonate and 600 parts of water and the mixture obtained must remain alkaline until the end of this addition. After removing the pyridine as vapour, the derivative disulphonated on the amino groups crystallises on cooling. It is dried and washed to neutrality with a saturated solution of sodium chloride.

It is then progressively introduced into 500 parts of water, well agitated and kept at boiling point, into which 100 parts of fine iron turnings and 4 parts of glacial acetic acid had previously been introduced.

Upon the completion of the reduction, 5 parts of sodium carbonate are added, the mixture is filtered hot and the alkaline filtrate is concentrated in the absence of air until crystallisation begins. The sodium 1:2:4-triamino-benzene-$N^1$:$N^4$-disulphonate obtained is allowed to dry and cool and after desiccation, forms a beige powder. After crystallisation from a water-alcohol mixture, very fine light beige crystals are obtained.

*Example 6.*—1-nitro-3:4-diamino-benzene is converted into disulphamate as in Example 5, then it is reduced by iron under the conditions set out in that example. The sodium 1:2:4-triamino-benzene-$N^1$:$N^2$-disulphonate is highly soluble; it is isolated from its aqueous solutions by concentration, and it appears in the form of a light beige powder.

The 1-nitro-3:4-diamino-benzene is obtained by following the instructions of Griffin and Peterson (Organic Syntheses 21, page 20).

*Example 7.*—22 parts of 2:4-diamino-1-acetylamino-benzene are sulphonated by the action of 37 parts of sulphuric chlorhydrin previously introduced into 125 parts of anhydrous pyridine by following the instructions in Example 5. After having been agitated for 3 hours at ordinary room temperature, the mixture obtained is allowed to flow into a solution containing 55 parts of sodium carbonate and 150 parts of water. The pyridine is removed as vapour. On cooling, the disulphonate crystallises, it is dried and treated at boiling point for 30 minutes with 10 times its weight of a 5% caustic soda solution, then the mixture is cooled to 10° C., the greater part of the alkali is neutralised, it is concentrated and cooled down to about 10° C.; hydrochloric acid is added so as to precipitate the disulphamic acid. This is dried and washed in iced water; it is redissolved in the theoretical quantity of sodium hydroxide solution to form the disulphonate. The solution is evaporated until crystallisation of the sodium 1:2:4-triamino-benzene-$N^2$:$N^4$-disulphonate begins; after desiccation, the latter has the appearance of a light chestnut powder.

The 2:4-diamino-1-acetylamino-benzene may be prepared by reducing, by means of iron, 2:4-dinitro-1-acetylamino-benzene (Van de Vliet-Recueil de travaux chimiques des Pays-Bas 43 p. 610) by following the method given in German Patent No. 183,843 of October 3, 1902.

*Example 8.*—A cotton fabric is printed with the following mixture:

| | Grms. |
|---|---|
| Sodium 1:2:4-triamino-benzene-$N^2$-sulphonate | 44 |
| Sodium chlorate | 20 |
| Ammonium chloride | 20 |
| 25% copper sulphate | 10 |
| 1% ammonium vanadate | 20 |
| 20% ammonia | 10 |
| Water and starch thickener | 876 |
| | 1000 |

After drying, it is vaporised for 8 minutes in neutral steam, it is washed and soaped at boiling point in the usual manner. Dark brown patterns are obtained.

Similar shades are obtained by printing under the same conditions, cellulose acetate, chlorinated wool, silk, mercerised cotton or regenerated cellulose fabrics; the most intense shades are obtained on the latter fibre and the least intense on silk.

By replacing the sodium 1:2:4-triamino-benzene-$N^2$-sulphonate by equivalent quantities of other sulphamates of triaminobenzene, the following shades are obtained:

| | |
|---|---|
| Sodium 1:2:4-triamino-benzene-$N^1$-sulphonate | Dark brown. |
| Sodium 1:2:4-triamino-benzene-$N^4$-sulphonate | Brown. |
| Sodium 1:2:4-triamino-benzene-$N^1$:$N^2$-disulphonate | Dark brown. |
| Sodium 1:2:4-triamino-benzene-$N^1$:$N^4$-disulphonate | Brown. |
| Sodium 1:2:4-triamino-benzene-$N^2$:$N^4$-disulphonate | Brown. |

*Example 9.*—A cotton fabric is printed with the following mixture:

| | Grms. |
|---|---|
| Sodium 1:2:4-triamino-benzene-$N^1$-sodium sulphonate | 44 |
| Sodium chlorate | 20 |
| Ammonium oxalate | 30 |
| 1% ammonium vanadate | 20 |
| 20% ammonium | 10 |
| Water and starch thickener | 876 |
| | 1000 |

After drying it is vaporised for 6 minutes in neutral steam, washed and soaped at boiling point in the usual manner, and brown patterns are obtained.

By replacing the sodium 1:2:4-triamino-benzene-$N^1$-sulphonate by equivalent quantities of other sulphamates of triaminobenzene given hereunder, similar shades are obtained:

Sodium 1:2:4-triamino-benzene-$N^2$-sulphonate.
Sodium 1:2:4-triamino-benzene-$N^4$-sulphonate.
Sodium 1:2:4-triamino-benzene-$N^1$-$N^2$-disulphonate.
Sodium 1:2:4-triamino-benzene-$N^1$:$N^4$-disulphonate.
Sodium 1:2:4-triamino-benzene-$N^2$:$N^4$-disulphonate.

*Example 10.*—The following mixture is printed on a cotton fabric:

| | Grms. |
|---|---|
| Sodium 1:2:4-triamino-benzene-$N^1$-sulphonate | 22 |
| Sodium 1:2:4-triamino-benzene-$N^2$-sulphonate | 22 |
| Sodium chlorate | 20 |
| Ammonium oxalate | 30 |
| 1% ammonium vanadate | 20 |
| 20% ammonia | 10 |
| Water and starch tragacanth thickener | 876 |
| | 1000 |

After drying, it is vaporised for 6 minutes in neutral steam, and the customary treatment is applied; brown patterns are obtained.

*Example 11.*—The following mixture is printed on a cotton fabric:

| | Grms. |
|---|---|
| Sodium 1:2:4-triamino-benzene-$N^1$-sulphonate | 44 |
| Sodium chlorate | 10 |
| 1% ammonium vanadate | 20 |
| 20% ammonia | 10 |
| Water and starch-tragacanth thickener | 916 |
| | 1000 |

After drying, it is vaporised for 10 minutes in acetic or formic vapour and the process is concluded as in the foregoing examples; brown patterns are obtained.

*Example 12.*—The following mixture is printed on a cotton fabric:

| | Grms. |
|---|---|
| Sodium 1:2:4-triamino-benzene-$N^1$-sulphonate | 44 |
| Ammonium chloride | 60 |
| Sodium ferrocyanide | 10 |
| Sodium chlorate | 30 |
| 20% ammonia | 10 |
| Water and starch-tragacanth thickener | 846 |
| | 1000 |

After drying, it is vaporised for 8 minutes in neutral steam and washed at boiling point; brown patterns are obtained.

*Example 13.*—The following mixture is printed on a cotton fabric:

| | Grms. |
|---|---|
| Sodium 1:2:4-benzene-$N^1$-sulphonate | 22 |
| Crystallised sodium bichromate | 30 |
| Ammonium chloride | 40 |
| 20% ammonia | 40 |
| Water and starch-tragacanth thickener | 868 |
| | 1000 |

After drying it is vaporised for 8 minutes in neutral steam. After the customary treatment, brown patterns are obtained.

*Example 14.*—The following mixture is printed on a cotton fabric:

| | Grams |
|---|---|
| Sodium 1:2:4-triamino-benzene-$N^1$-sulphonate | 30 |
| Resorcinol | 24 |
| Sodium chlorate | 20 |
| Ammonium oxalate | 30 |
| 1% ammonium vanadate solution | 20 |
| 20% ammonia | 10 |
| Water and starch-tragacanth thickener | 866 |
| | 1000 |

After drying, it is vaporized for 5 minutes in neutral steam and the treatment is effected as in the foregoing examples. Brown prints are obtained.

By replacing the resorcinol with 32 grams of 1:5-dihydroxy-naphthalene or 24 grams of pyrocatechol dark brown patterns are obtained.

*Example 15.*—A cotton fabric is printed with the following mixture:

| | Grams |
|---|---|
| Sodium 1:2:4-triamino-benzene-$N^1$-sulphonate | 12 |
| Sulphuric ester of the leuco derivative of dibenzpyrene-quinone | 40 |
| Sodium chlorate | 20 |
| Ammonium oxalate | 30 |
| 1% ammonium vanadate solution | 20 |
| 20% ammonia | 10 |
| Water and starch-tragacanth thickener | 868 |
| | 1000 |

It is dried and vaporised for 5 minutes in neutral steam; and washed at boiling point. Yellowish brown patterns are obtained.

*Example 16.*—A cotton fabric is printed with the following mixture:

| | Grams |
|---|---|
| Sodium 1:2:4-triamino-benzene-$N^1$-sulphonate | 22 |
| Mixture of the diazoamino derivative obtained from diazotised 1-amino-4-benzoylamino-2:5-dihydroxybenzene and from sarcosine with 1-amino-(2-hydroxy-3-napthoyl-benzene | 20 |
| Sodium chlorate | 10 |
| Urea | 30 |
| Sodium sulphoricinate | 20 |
| Diethyleneglycol | 20 |
| Sodalye (38° Bé.) | 20 |
| 1% ammonium vanadate solution | 20 |
| Water and starch-tragacanth thickener | 838 |
| | 1000 |

After drying, it is vaporised for 10 minutes in acetic or formic vapour, then washing is effected at boiling point; blackish brown prints are obtained.

*Example 17.*—Cotton fabric is printed with the following mixture:

| | Grams |
|---|---|
| Sodium 1:2:4-triamino-benzene-$N^1$-sulphonate | 22 |
| Sodium 1-amino-4-phenylamino-benzene-$N^1$-sulphonate | 18 |
| Sodium chlorate | 30 |
| Ammonium oxalate | 30 |
| Thiodiglycol | 40 |
| 1% ammonium vanadate solution | 20 |
| 20% ammonia | 10 |
| Water and starch-tragacanth thickener | 830 |
| | 1000 |

After drying, it is vaporised for 5 minutes in neutral steam then it is soaped at boiling point. Brownish black prints are obtained.

*Example 18.*—A cotton fabric is filled with the following mixture:

| | Grams |
|---|---|
| Sodium 1:2:4-triamino-benzene-N¹-sulphonate | 40 |
| Sodium chlorate | 20 |
| Ammonium oxalate | 30 |
| 1% solution of ammonium vanadate | 20 |
| 20% ammonia | 10 |
| Water and starch tragacanth thickener | 880 |
| | 1000 |

It is dried and then vaporised for 5 minutes in neutral steam; soaping is effected at the boil. The cotton is dyed brown.

*Example 19.*—A chrome tanned rabbit skin is steeped in 25 times its weight of the following solution:

| | |
|---|---|
| Sodium 1:2:4-triamino-benzene-N¹-sulphonate gr | 1 |
| Hydrogen peroxide (12 volume) ccs | 15 |
| 36% hydrochloric acid ccs | 15 |
| Water ccs | 319 |

The temperature of the bath is increased to 25–30° C. and the fur is left in it for 6 hours. After rinsing in water, the fur is dyed a brownish violet.

*Example 20.*—Into a mixture of 17 parts of sulphuric chlorhydrin and 50 parts of pyridine, there is added 7 parts of 3-nitro-1:2-diamino-benzene. After two hours agitation, the liquid obtained is poured into a mixture of 100 parts of water and 25 parts of sodium carbonate. The pyridine is driven off by steam. The solution, of which the volume is about 125 parts, is cooled to between 0° C. and 5° C. and neutralised by means of hydrochloric acid. It is introduced over half an hour, in small portions, into a strongly agitated and boiling mixture of 15 parts of iron filings and 20 parts of water to which there had previously been added 0.5 part of glacial acetic acid. When the reduction is finished the solution is made alkaline with sodium carbonate, it is filtered and the filtrate is distilled until salts are precipitated. It is then filtered after cooling. The new filtrate is distilled again, and filtered after cooling. The same series of operations is repeated once more. The last filtrate is evaporated to dryness under vacuum. It is constituted principally by a beige coloured powder of sodium 1:2:3-triamino-benzene-N²:N³-disulphonate which can be crystallised from a mixture of water and alcohol. The 3-nitro-1:2-diamino-benzene used as the raw material is prepared according to the method of Borsche and Rantscheff (Liebigs Annalen 379, page 163).

*Example 21.*—A sulphonating mixture is prepared with 100 parts by volume of anhydrous pyridine and 13 parts of sulphuric chlorhydrin. There is introduced into it at ordinary room temperature 15 parts of 2:6-dinitro-4-amino-1-methyl benzene. After two hours of agitation the mass obtained is poured into a mixture containing 24 parts of sodium carbonate and water. The pyridine is driven off in steam. The solution, of which the volume is about 150 parts, gives on cooling a precipitate of sodium 2:6-dinitro-4-amino-1-methyl-benzene - N⁴ - sulphonate, which is washed till neutral with a saturated solution of sodium chloride. This product is reduced by iron in the manner described in Example 1, and after being made alkaline with sodium carbonate, the filtered solution, free from iron, is distilled so as to obtain a solution measuring about 40 parts by volume. After cooling to ordinary room temperature the precipitate of 2:4:6-triamino-1-methyl-benzene-N⁴-sulphonate formed is dried. It is slightly coloured. On crystallization from a mixture of water and alcohol it forms a pale pink powder.

The 2:6-dinitro-4-amino-1-methyl-benzene used as starting material was prepared according to Hollemann and Boeseken (Recueil 16, page 426).

We claim:
1. Products of the general formula:

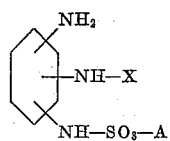

in which X represents a member selected from the group consisting of the hydrogen atom and the —SO₃A group, A represents a cation selected from the group consisting of hydrogen, ammonium, and the alkali metals and the substituents of the benzene nucleus being in the positions 1, 2, 4.

2. Products of the general formula:

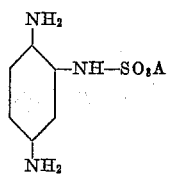

in which A represents a cation selected from the group consisting of hydrogen, ammonium, and the alkali metals.

3. Products of the general formula:

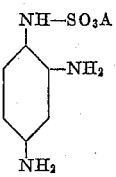

in which A represents a cation selected from the group consisting of hydrogen, ammonium, and the alkali metals.

4. Products of the general formula:

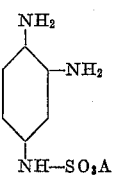

in which A represents a cation selected from the group consisting of hydrogen, ammonium, and the alkali metals.

5. Products of the general formula:

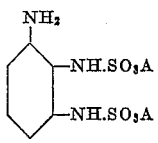

in which A represents a cation selected from the group consisting of hydrogen, ammonium, and the alkali metals.

6. Fibres coloured by the oxidation product of a compound of the general formula:

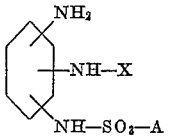

in which X represents a member selected from the group consisting of the hydrogen atom and the —SO₃A group, A represents a cation selected from the group consisting of hydrogen, ammonium, and the alkali metals, the substituents of the benzene nucleus being in the positions 1, 2, 4.

7. The process for the preparation of colouring matters on fibres which comprises applying on the fibres a sulphamate of the general formula:

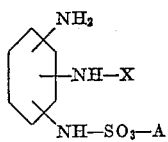

in which X represents a member selected from the group consisting of the hydrogen atom and the —SO₃A group, A represents a cation selected from the group consisting of hydrogen, ammonium and alkali metals, the substituents of the benzene nucleus being in the position 1, 2, 4; and an oxidizing agent and developing the colour on said fibres.

8. The process as defined in claim 7 in which the sulphamate has the formula:

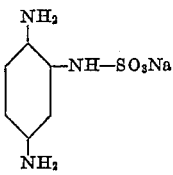

9. The process as defined in claim 7 in which the sulphamate has the formula:

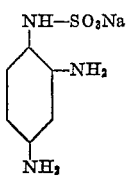

10. The process as defined in claim 7 in which the sulphamate has the formula:

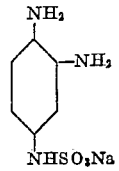

11. The process as defined in claim 7 in which the sulphamate has the formula:

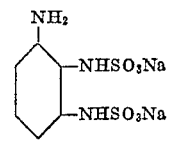

References Cited in the file of this patent

FOREIGN PATENTS

| | | |
|---|---|---|
| 1,045,530 | France | June 24, 1953 |
| 498,755 | Great Britain | Jan. 9, 1939 |

OTHER REFERENCES

Weil et al.: Berichte, vol. 55B, pp. 2534 and 2542 (1922).

Lantz: Bull. Soc. Chim. France, 1948, pp. 489–91.

"Organic Chem.," by V. von Richter, transl. by D'Albe, pub. Phila. by P. Blakiston Sons, and Co., 1922, vol. 2, p. 118.